(12) United States Patent
Broer

(10) Patent No.: US 8,217,793 B2
(45) Date of Patent: Jul. 10, 2012

(54) ROGUE RFID DETECTOR

(75) Inventor: Dirk A. Broer, Silver Spring, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 640 days.

(21) Appl. No.: 12/333,463

(22) Filed: Dec. 12, 2008

(65) Prior Publication Data

US 2010/0148964 A1    Jun. 17, 2010

(51) Int. Cl.
G08B 13/14    (2006.01)
(52) U.S. Cl. .................... 340/572.1; 340/572.7
(58) Field of Classification Search ........... 340/572.1, 340/572.7, 10.1, 10.51
See application file for complete search history.

(56) References Cited

U.S. PATENT DOCUMENTS

| 7,245,213 | B1 | 7/2007 | Esterberg et al. | |
|---|---|---|---|---|
| 2006/0022815 | A1 | 2/2006 | Fischer et al. | |
| 2006/0170565 | A1 | 8/2006 | Husak | |
| 2007/0025334 | A1 | 2/2007 | Meyer | |
| 2007/0046467 | A1 | 3/2007 | Chakraborty et al. | |
| 2007/0096876 | A1* | 5/2007 | Bridgelall et al. | 340/572.1 |
| 2007/0200712 | A1* | 8/2007 | Arneson et al. | 340/572.7 |
| 2009/0214038 | A1* | 8/2009 | Wong et al. | 380/270 |

FOREIGN PATENT DOCUMENTS

EP    1876551 A1    1/2008
GB    2431545 A    4/2007

OTHER PUBLICATIONS

PCT International Search Report Dated June 18, 2010.

* cited by examiner

Primary Examiner — John A. Tweel, Jr.
(74) Attorney, Agent, or Firm — Bartholomew J. Divita; Terri Hughes Smith; Kenneth A. Haas

(57) ABSTRACT

A system, techniques, and apparatus for detecting rogue RFID readers are disclosed. The system detects unauthorized reader to tag communication, and with multiple detectors, provides location information concerning one or more unauthorized readers. The system can detect high power commands of an unauthorized reader(s) in predefined areas and be integrated with an article surveillance system.

22 Claims, 3 Drawing Sheets

ROGUE RFID DETECTOR

TECHNICAL FIELD

This disclosure relates to radio frequency identification (RFID) technology, and more particularly to detecting rogue RFID readers and writers.

BACKGROUND

Radio frequency identification (RFID) implementations have become very useful for electronic asset management and security in modern business. Implementations are based on electronic interaction between REID tags and RFID readers.

RFID tags are electronic devices attached to physical objects containing information related to the object. RFID readers communicate with tags through one or more antennas to collect information about the presence, identification and location of items such as inventory items, personal or business assets.

RFID readers can have a relatively short or long range of operation depending on their operating frequency, transmitter power level and specific application requirement. A reader may work as a stand-alone instrument or as part of a RFID reader network. RFID reader networks are often capable of simultaneously reading multiple RFID tags, registering and monitoring the status of tagged items, and reporting possible malfunctioning, disappearance, or unauthorized movement of objects.

Although benefits of RFID implementations are apparent, several problems can arise with their use. For example, in areas with public access, RFID tags can be compromised by individuals using an unauthorized reader, hereinafter referred to as a rogue reader, which can issue commands to alter, reprogram, lock, or disable tags. The existence of a rogue reader can be especially problematic in a commercial environment, where these implementations are used for asset management and security.

Accordingly, there is a need for detecting the presence of rogue RFID readers in RFID implementations.

SUMMARY

A system, techniques, and apparatus for detecting rogue RFID readers are disclosed. The system detects unauthorized reader to tag communication, and with multiple detectors, provides location information concerning one or more unauthorized readers. The system can detect high power commands of an unauthorized reader(s) in predefined areas and be integrated with an article surveillance system.

For example, according to one aspect, a method of detecting unauthorized RFID reader to tag communication includes identifying an interrogating Radio Frequency (RF) wave directed to a population of RFID tags, the interrogating wave having a first intensity greater than a second wave intensity transmitted by each of the population of RFID tags, comparing source identifying information associated with the wave to source identifying information associated with at least one allowable RFID reader, and detecting an unauthorized RFID reader access to at least one of the population of RFID tags based on the comparison.

In one embodiment, the method includes identifying the interrogating RF wave using a Digital Signal Processor. The Digital Signal Processor is operatively coupled to an authorized RFID reader. The method can also include generating an alert based on detection of the unauthorized RFID reader. In one embodiment, the method includes displaying the alert on a display device.

In another embodiment, the method further includes determining location information of the unauthorized RFID reader using multiple authorized RFID readers configured to perform triangulation. The method can also include transmitting the location information to a surveillance system. For example, in one embodiment, the method includes directing a video component of the surveillance system toward a physical location representative of the location information. The method also can include determining whether a command associated with the interrogation wave is a read command, reprogram command, lock command, or disable command, and generating an alert based on the determination. In embodiments, the method also includes detecting a jamming signal based on the first intensity of the interrogating RF wave.

In another aspect, an RFID reader includes an antenna, a transducer operatively coupled to the antenna to transmit and receive Radio Frequency (RF) waves, and a signal processor to process the waves. The signal processor is configured to include a processor and memory configured to include memory storing instructions that, in response to a request, cause the processor to identify an interrogating Radio Frequency (RF) wave directed to a population of RFID tags, the interrogating wave having a first intensity greater than a second wave intensity transmitted by each of the population of RFID tags. The signal processor compares source identifying information associated with the wave to source identifying information associated with at least one authorized RFID reader, and detects an unauthorized RFID reader access to at least one of the population of RFID tags based on the comparison.

In one embodiment, the RFID reader further includes a Digital Signal Processor to identify the interrogating RF wave. The processor of the RFID reader can generate an alert based on detection of the unauthorized RFID reader. In one embodiment, the processor of the RFID reader displays the alert on a display device.

In another embodiment, the processor of the RFID reader determines location information of the unauthorized RFID reader using triangulation and input from at least one additional authorized reader. The RFID reader can also transmit the location information to a surveillance system. For example, in one embodiment, the RFID processor sends instructions to the surveillance system to direct a video component of the surveillance system toward a physical location representative of the location information.

In yet another embodiment, the processor of the RFID reader determines whether a command associated with the interrogation wave is a read, reprogram, lock, or disable command, and generates an alert based on the determination. The processor can also detect a jamming signal based on the first intensity of the interrogating RF wave.

In yet another aspect, an RFID system includes a RFID tag and a RFID reader configured to transmit and receive Radio Frequency (RF) waves to the RFID tag. The RFID reader is configured to include a detection module that 1) identifies an interrogating Radio Frequency (RF) wave directed to the tag, the interrogating wave having a first intensity greater than a second wave intensity transmitted by the tag, 2) compares source identifying information associated with the wave to source identifying information associated with at least one allowable RFID reader, and 3) detects an unauthorized RFID reader access to the tag based on the comparison.

In one embodiment, the RFID system further includes a plurality of RFID readers configured to determine a physical location of the unauthorized reader using triangulation. At least one of the plurality of RFID readers can be operatively coupled to an electronic article surveillance system for receiving and visually displaying the physical location of the unauthorized RFID reader.

Various advantages can be obtained using the present invention. For example, the present invention can be integrated with an Electronic Article Surveillance system to provide location information regarding unauthorized readers. The invention can also be used to detect reader usage which could be, for example, a competitor attempting to gain a competitive advantage. Further, the invention can be applied to secret and military uses of RFID technology.

Additional features and advantages will be readily apparent from the following detailed description, the accompanying drawings and claims.

BRIEF DESCRIPTION OF DRAWINGS

Like reference symbols in the various drawings indicate like elements.

DETAILED DESCRIPTION

Figure 1:
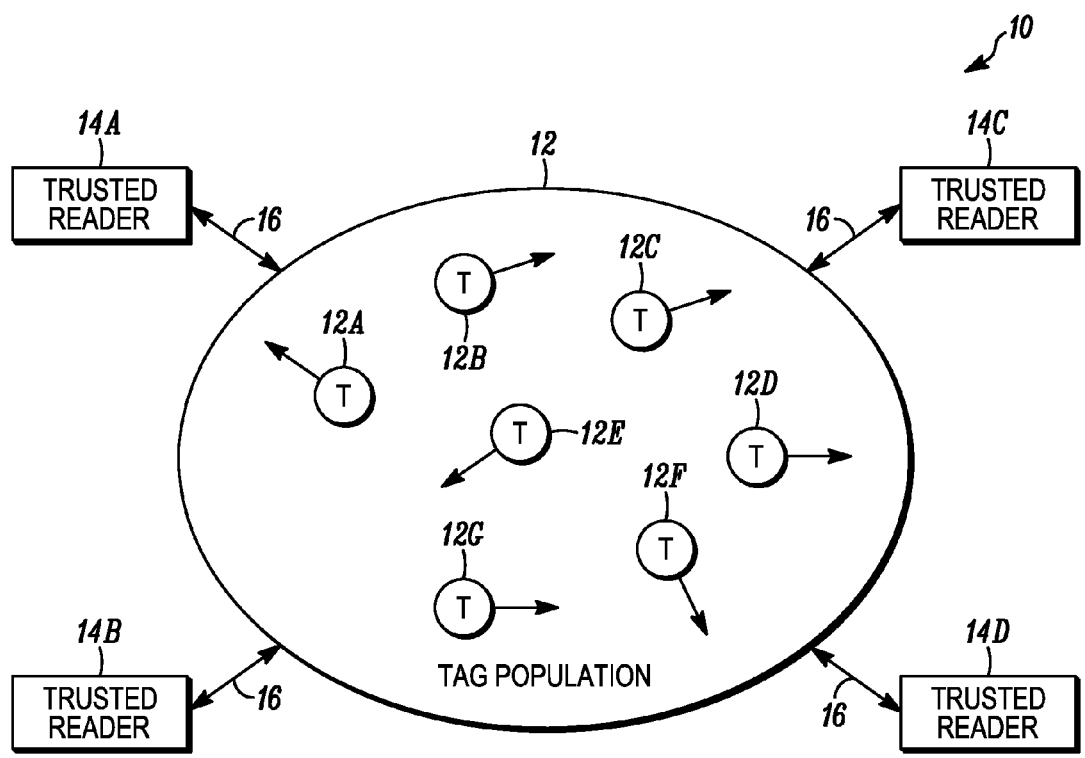
FIG. 1 depicts an environment where an exemplary population of RFID tags is being interrogated by a plurality of trusted RFID readers.

FIG. 1 describes a system 10, which includes a population 12 of RFID tags 12A-G, and trusted readers 14A-D. As used herein, the phrase "trusted reader" refers to an authorized RFID reader in an environment. Trusted RFID readers 14A-D may operate independently, or may be connected together to form a reader network. Although not shown explicitly in FIG. 1, each of the readers 14A-D is coupled to one or more antennas. When a reader 14 transmits an interrogation signal 16 through its corresponding antenna, one or more transponders or tags 12 respond by sending a signal 16 back to the reader. Signal 16 contains tag identification data, that can be decoded by interrogating readers 14 in order to retrieve relevant information about a tag 12, such as its price, location etc. Signal 16 may contain information about the operational "state" of a tag 12, which assists readers 14A-D in determining an optimum tag interrogation interval to interrogate the same population of tags.

Interaction between tags 12A-G and trusted readers 14A-D takes place according to certain communication protocols. Examples of such protocols include Class 0, Class 1, and more recently developed Generation 2, all of which are different classes approved by the RFID standards organization EPCglobal (EPC=Electronic Product Code).

Once tags are identified, individual tags may be addressed using their identifiers. For example, a reader may perform additional operations (e.g., read, write and lock) on a tag within its operational field by first transmitting a "select" command, including the identifier of the tag, setting the identified tag into a communicative state. The reader may then utilize additional commands (e.g., write block, read block, lock block, etc) to control or access data of the selected tag. For example, the reader may read data from one or more memory blocks of the selected tag using a read block command. In another example, the reader may write data to one or more memory blocks of the selected tag using a write command. In another example, the reader may prevent further changes to one or more memory blocks of the selected tag using a lock command. Thus, operations performed upon tags 12A-G by trusted readers 14A-D typically involve first selecting the tag using its identifier and then reading or writing data from and to the selected tag.

Figure 2:
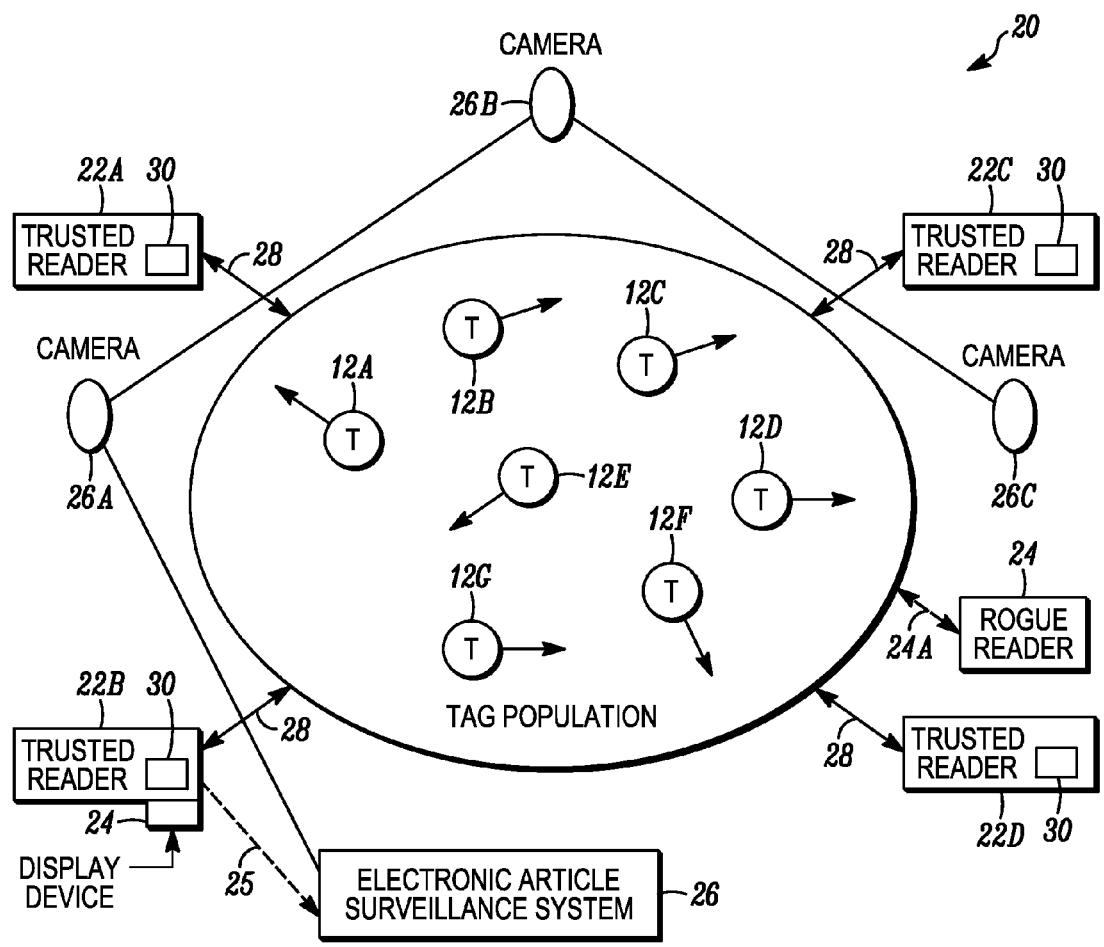
FIG. 2 illustrates a system where an exemplary rogue RFID reader is detected according to the present invention.

Turning now to FIG. 2, a typical RFID system 20 incorporating an aspect of the present invention is disclosed. The system 20 can detect the presence of a rogue reader 24. As used herein, the phrase "rogue reader" refers to any unauthorized RFID reader that attempts communication with a RFID tag in a predefined area.

As shown in FIG. 2, the system 20 can include a plurality of trusted readers 22A-D that receive and transmit interrogation signals 28 to and from the population 12 of RFID tags 12A-G. In one embodiment, as shown in FIG. 2, the system 20 is integrated with an electronic article surveillance system 26. The surveillance system 26 includes a plurality of video components, such as video cameras 26A-C, that can be directed at various angles to view objects, such as tags and readers, in the pre-defined area.

Trusted readers 22A-D are preferably configured to communicate with one another and are arranged to form a reader network. The reader network can be used to detect and identify commands and locations of rogue or unauthorized RF transmitters 24 attempting to read tags, reprogram writable tags, and/or issuing kill commands by sending a RF signal 24A to the tags 12. For example, the issuance of a kill command from the rogue reader 24 shown in FIG. 2 can permanently disable one or more tags 12, and render the tags 12 useless and the item or individual to which the tag is attached undetectable by trusted readers 22A-D.

The network of readers can be used to determine the location of the rogue reader 24 via wired (e.g., Ethernet) or wireless (e.g., IEEE 802.11) signaling. Specifically, in one embodiment, the trusted readers 22A-D are configured to monitor each others' backbone transmissions and/or tag transmissions, and use the times of signal arrival, time differences of signal arrival, and information relating to antenna beam pointing, antenna nulling, and received signal strength to determine the physical location of the rogue readers 24 in the system 20. This technique can be used to enhance security by determining the locations of one or more rogue readers that may have been inserted into the reader network, and which may attempt to communicate via the reader backbone. As described below, received signal information can then be compared against expected values for signals from trusted readers, and any deviations (which may be indicative of rogue reader commands) can be reported to the system operator (Operator) via an alerting mechanism. Further, location information of the rogue reader 24 can be determined and transmitted to the article surveillance system 26.

Trusted readers 22A-D are preferably configured to include a detection module 30 that can identify an interrogating Radio Frequency (RF) wave directed to the population 12 of RFID tags 12A-G. One or more of the trusted readers 22A-D can be configured to include a digital sensor processor to sense RF wave intensities being transmitted to and from population of tags 12A-G. If an interrogating wave has an intensity greater than a typical wave intensity transmitted by the population of RFID tags, the detection module 30 determines that the rogue reader 24 may be present in the system 20.

For example, in one embodiment, if the detection module 30 detects an interrogating wave having an intensity greater than a typical wave intensity transmitted by the population of RFID tags 12A-G, the detection module 30 compares source identifying information associated with the interrogating wave to source identifying information associated with trusted RFID readers 22A-D. In one embodiment, source identifying information associated with trusted RFID readers 22A-D is stored and accessible from a database. If the source identifying information does not match authorized sources, the detection module 30 detects the presence of the rogue reader 24. In one embodiment, the detection module also determines whether a command associated with the interrogation wave is a read tag command, reprogram tag command, lock tag command, or disable tag command, and provides the determination in the alert.

Once an alert is generated, the detection module 30 displays the generated alert on a display device 24 operatively coupled to the trusted reader. In another embodiment, the alert is displayed on a remote display device. Thus, corrective action can be taken by the system 20, by an operator associated with the system 20, or otherwise, to remove and/or reduce the influence of the rogue reader 24.

Based on the number and configuration of trusted readers 22A-D in the system 20, the system 20 can provide location information of the unauthorized RFID reader 24.

For example, in one embodiment, where trusted readers 22A-D are arranged in a reader network, readers 22A-D are time synchronized and operative to time-stamp the time of reception of RF signals transmitted by reader devices, including any rogue readers, thereby allowing information received by different readers to be combined for the purpose of locating the rogue reader 24 and generating alerts comprising location information. In one embodiment, the process of determining the physical location of the rogue reader 24 includes calculating a time difference of signal arrivals by combining information relating to time-stamped signal receptions. It is noted that knowledge of the signal arrival times and signal transmit times generally provides sufficient information for performing rogue reader profiling and triangulation of the rogue reader 24.

In alternative modes of operation, at least one trusted reader is operable to determine the difference between the carrier frequency employed in its own RF transmissions and that employed in the RF transmissions of other reader devices, and to pass that information along to one or more other trusted reader devices to detect the presence of the rogue RFID reader 24. Further, the at least one trusted reader is operable to capture a digitized received modulation waveform (time stamped), and to forward it to another device for remote analysis/correlation, such as a server.

Once the rogue reader location information is determined, in an embodiment, any of the trusted readers 22A-D can transmit the location information to the electronic surveillance system 26 which, as shown in FIG. 2, can include various video components, such as but not limited to video cameras 26A-C. For example, as shown in FIG. 2, once the existence and location of rogue reader 24 is determined by the plurality of trusted readers, one of the trusted readers 22B can transmit the location information 25 to the surveillance system 26. In some embodiments, one of the trusted readers 22B directs a video component of the surveillance system, such as the cameras 22A-C, toward the physical location representative of the location information for viewing or filming by system operators or the system 20.

Advantageously, the system 20 can be synchronized with trusted readers in a particular area to avoid false positives. The system can also be used to detect simple reader usage (not altering) which could be, for example, a competitor attempting to gain strategic knowledge of tagged product items.

Still further, the system can be used to determine jamming signals from rogue readers. For example, in instances where trusted readers may have received a corrupted response from tags, the system 20 can determine that an area around one of the tags is suffering from unwanted interference. The detection module 30 can generate an alert and corrective measures can then be taken by trusted readers, an operator of the system, or otherwise.

Figure 3:
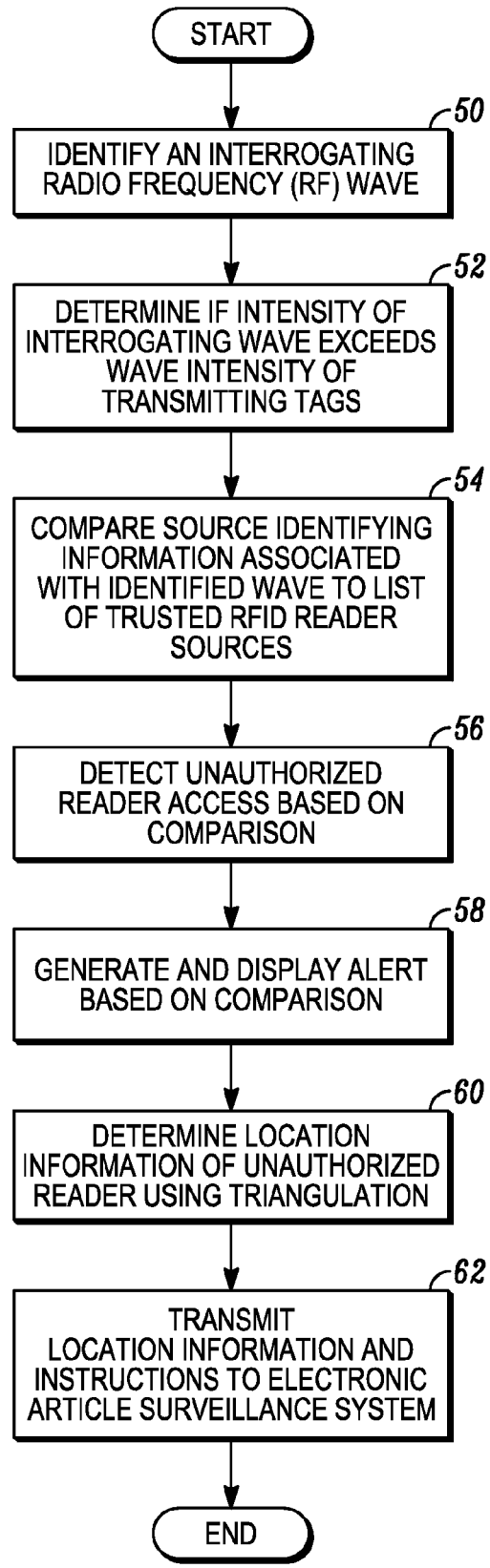
FIG. 3 illustrates an exemplary method executed by the detection module to detect a rogue RFID reader or writer.

Turning now to FIG. 3, in one embodiment, a method executed by the detection module 30 of the present invention is disclosed. It will be appreciated by one skilled in the art that the steps disclosed in FIG. 3 are merely exemplary and can be modified and combined in various ways without limiting the scope or breadth of the present disclosure or claims. First, as shown in FIG. 3, the detection module 30 of a trusted reader identifies an interrogating radio wave frequency in the system 50. Next, the detection module determines if the intensity of the wave exceeds a wave intensity of transmitting tags 52. If the intensity of the wave exceeds the wave intensity of transmitting tags, the detection module 30 compares source identifying information associated with the identified wave to a list of trusted RFID reader sources 54. In one embodiment, as described previously, the list of trusted reader sources can be stored in a database and be accessible to the detection module 30. Next, the detection module 30 detects an unauthorized reader in the system based on the comparison 56. The detection module 30 then generates and displays an alert indicating the existence of the rogue RFID reader based on the comparison 58. In embodiments of the system 20 that include a network of trusted readers 22A-D, the detection module 30 determines the location information of the rogue reader 24 using a triangulation technique 60 and input data from at least one other trusted reader, as described previously. Finally, in one embodiment, the detection module 30 transmits the location information to an electronic article surveillance system along with instructions 62 to direct video components of the system 26, such as cameras 26A-C toward a physical location of the rogue reader 24 for viewing or filming.

Various features of the system may be implemented in hardware, software, or a combination of hardware and software. For example, some features of the system may be implemented in computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

What is claimed is:

1. A method of detecting unauthorized RFID reader to tag communication comprising:
   identifying an interrogating Radio Frequency (RF) wave directed to a population of RFID tags, the interrogating wave having a first intensity greater than a second wave intensity transmitted by each of the population of RFID tags;
   comparing source identifying information associated with the wave to source identifying information associated with at least one allowable RFID reader; and
   detecting an unauthorized RFID reader access to at least one of the population of RFID tags based on the comparison.

2. The method of claim 1, wherein identifying the interrogating RF wave comprises using a Digital Signal Processor.

3. The method of claim 2, wherein the Digital Signal Processor is operatively coupled to an authorized RFID reader.

4. The method of claim 1, comprising generating an alert based on detection of the unauthorized RFID reader.

5. The method of claim 4, comprising displaying the alert on a display device.

6. The method of claim 1, further comprising determining location information of the unauthorized RFID reader using a plurality of authorized RFID readers configured to perform triangulation.

7. The method of claim 6, further comprising transmitting the location information to a surveillance system.

8. The method of claim 7, comprising directing a video component of the surveillance system toward a physical location representative of the location information.

9. The method of claim 1, further comprising:
determining whether a command associated with the interrogation wave is a read command, reprogram command, lock command, or disable command; and
generating an alert based on the determination.

10. The method of claim 1, further comprising detecting a jamming signal based on the first intensity of the interrogating RE wave.

11. A RFID reader comprising:
an antenna;
a transducer operatively coupled to the antenna to transmit and receive Radio Frequency (RF) waves; and
a signal processor to process the waves, the signal processor configured to include a processor and memory configured to include memory storing instructions that, in response to a request, cause the processor to:
identify an interrogating Radio Frequency (RF) wave directed to a population of RFID tags, the interrogating wave having a first intensity greater than a second wave intensity transmitted by each of the population of RFID tags;
compare source identifying information associated with the wave to source identifying information associated with at least one allowable RFID reader; and
detect an unauthorized RFID reader access to at least one of the population of RFID tags based on the comparison.

12. The RFID reader of claim 11, further comprising a Digital Signal Processor to identify the interrogating RF wave.

13. The RFID Reader of claim 11, wherein the processor generates an alert based on detection of the unauthorized RFID reader.

14. The RFID Reader of claim 13, wherein the processor displays the alert on a display device.

15. The RFID reader of claim 11, wherein the processor determines location information of the unauthorized RFID reader using triangulation and input data from at least one additional authorized reader.

16. The RFID reader of claim 15, wherein the processor transmits the location information to a surveillance system.

17. The RFID reader of claim 16, wherein the processor sends instructions to the surveillance system to direct a video component of the surveillance system toward a physical location representative of the location information.

18. The RFID reader of claim 11, wherein the processor determines whether a command associated with the interrogation wave is a read, reprogram, lock, or disable command, and generates an alert based on the determination.

19. The RFID reader of claim 11, wherein the processor detects a jamming signal based on the first intensity of the interrogating RF wave.

20. An RFID system comprising:
a RFID tag;
a RFID reader configured to transmit and receive Radio Frequency (RF) waves to the RFID tag, the RFID reader configured to include a detection module that 1) identifies an interrogating Radio Frequency (RF) wave directed to the tag, the interrogating wave having a first intensity greater than a second wave intensity transmitted by the tag, 2) compares source identifying information associated with the wave to source identifying information associated with at least one allowable RFID reader, and 3) detects an unauthorized RFID reader access to the tag based on the comparison.

21. The RFID system of claim 20, further comprising a plurality of RFID readers configured to determine a physical location of the unauthorized reader using triangulation.

22. The RFID system of claim 21, wherein at least one of the plurality of RFID readers is operatively coupled to an electronic article surveillance system for receiving and visually displaying the physical location of the unauthorized RFID reader.

* * * * *

UNITED STATES PATENT AND TRADEMARK OFFICE
CERTIFICATE OF CORRECTION

| | |
|---|---|
| PATENT NO. | : 8,217,793 B2 |
| APPLICATION NO. | : 12/333463 |
| DATED | : July 10, 2012 |
| INVENTOR(S) | : Broer |

It is certified that error appears in the above-identified patent and that said Letters Patent is hereby corrected as shown below:

In Column 1, Line 14, delete "REID" and insert -- RFID --, therefor.

Signed and Sealed this
Eighth Day of January, 2013

David J. Kappos
*Director of the United States Patent and Trademark Office*